Oct. 13, 1936.  F. H. MacLAREN ET AL  2,057,104
METHOD OF MANUFACTURING POUR POINT DEPRESSORS
Filed Dec. 29, 1934
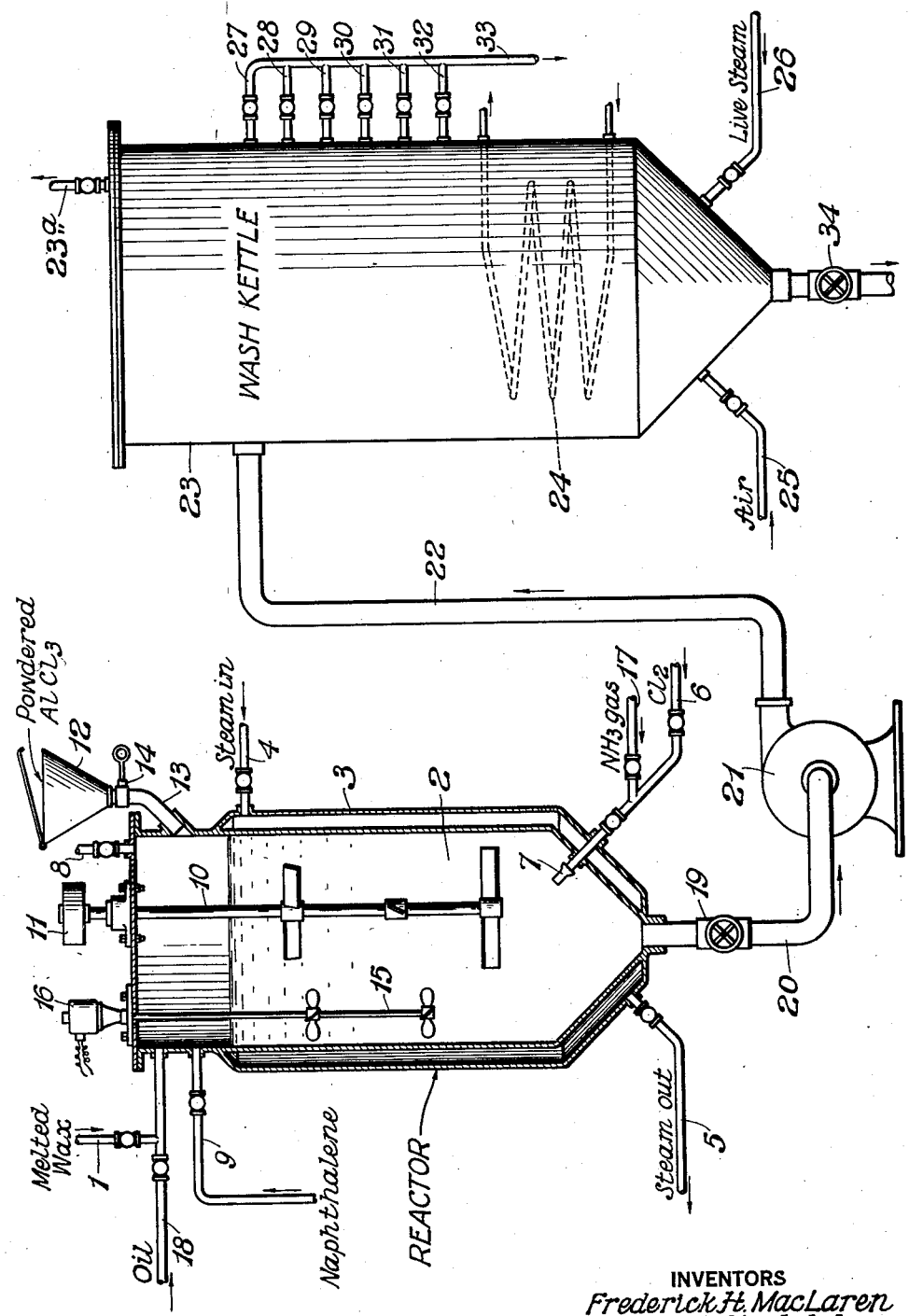
INVENTORS
*Frederick H. MacLaren*
*Thomas E. Stockdale*
BY Bruce K. Brown
ATTORNEY Patented Oct. 13, 1936

2,057,104

UNITED STATES PATENT OFFICE 2,057,104

METHOD OF MANUFACTURING POUR POINT DEPRESSORS

Frederick H. MacLaren, Calumet City, Ill., and Thomas E. Stockdale, Hammond, Ind., assignors to Standard Oil Company, Chicago, Ill., a corporation of Indiana Application December 29, 1934, Serial No. 759,728

10 Claims. (Cl. 196—78)

This invention relates to pour point depressors and in particular to improvements in the preparation of pour point depressors resulting from the condensation of halogenated hydrocarbons, particularly paraffin wax. More particularly this invention pertains to improvements in the preparation of condensation type pour point depressors described in U. S. 1,963,917 and U. S. 1,963,918.

The pour point depressors described in the aforementioned patents are prepared by mixing an aromatic hydrocarbon such as naphthalene with a chlorinated wax, adding thereto aluminum chloride at a rate sufficient to produce a violent reaction under controlled conditions and subsequently washing the condensation product, which hereinafter will be referred to as the "wax resin", with caustic soda solution. One of the most serious difficulties encountered in the preparation of the "wax resin" is emulsion formation during the washing step. When the "wax resin" is washed with caustic soda solution an emulsion is frequently obtained which is difficult to break even after prolonged heating and setting.

We have found that this difficulty can be overcome by purifying the condensation reaction products in the presence of an excessive amount of an electrolyte such as a salt, and by employing a minimum of water. The salts may be added as such, for example sodium chloride or common salt may be added, or the salts may be formed in situ, for example by treating the unpurified "wax resin" with an excess of ammonia gas whereby ammonium sulfate and other salts are formed.

It is therefore an object of our invention to prepare condensation type pour point depressors without the formation of attendant stable emulsions. Another object of our invention is to prepare condensation type pour point depressors having superior pour point depressing properties and improved color. A further object of our invention is to obtain increased yields of condensation type pour point depressors. Still another object is to avoid the use of light diluents in the neutralizing and washing step and thus avoid the necessity of their subsequent removal to produce high flash oils.

Our invention will be thoroughly understood by the following example, read in conjunction with the accompanying drawing which forms a part of this specification and which represents a diagrammatic elevational view of our system, parts being shown in vertical section.

Referring to the drawing, melted paraffin wax of about 130° F. melting point is introduced thru valved line 1 into the reactor 2 which is provided with a steam jacket 3 and heated by steam introduced thru valved line 4 and passing out valved line 5. The reactor 2 is preferably lined with glass or porcelain to avoid metal contact. The wax in reactor 2 is maintained at a temperature of about 250° F., and while at this temperature, chlorine gas is introduced into the reactor thru valved line 6 and ejector 7. The chlorine is absorbed by the wax and the rate of chlorination is aided by maintaining a fog or blanket of chlorine over the wax. This may be accomplished by maintaining a slight suction on exhaust line 8. The chlorination is continued until the wax contains about 14% chlorine.

At this point the introduction of chlorine into the reactor 2 is suspended and about 10% naphthalene (plus about 1% for volatilization loss) is introduced into the reactor 2 thru valved line 9. The naphthalene is thoroughly mixed with the chlorinated wax within the reactor 2 and the contents of the kettle are kept in motion by stirrer 10 rotated by driving means 11. While the mixture is maintained at a temperature of about 250° F., the chemical condensation of the chlor-wax and naphthalene is effected by adding thereto 10 and 15 percent powdered aluminum chloride through hopper 12 and line 13. The amount of aluminum chloride added to the reactor 2 is regulated by slide valve 14 so that only small portions of the aluminum chloride are added at any one time, the period for adding the required amount being spread over a period of 5 to 6 hours. During the chemical condensation process the mixture in reactor 2 is violently agitated by the stirrer 10 and the high speed stirrer 15 rotated by motor 16. During the period in which the aluminum chloride is added to the reactor 2 the temperature within the reactor is gradually raised to 250–350° F. and maintained at this temperature for about an hour after all the aluminum chloride has been added. The mixture in reactor 2 is then cooled to about 200° F.

At this point the "wax resin" is neutralized by passing dry ammonia gas thru valve line 17 and ejector 7 into the reactor until complete neutralization is obtained. After the neutralization, the neutralized "wax resin" is diluted with a high grade pale oil introduced into reactor 2 thru valved line 18. The oil is preferably one having a color of about 1½–2 N. P. A. and a viscosity of 200 seconds at 100° F. Saybolt universal although oils of 100 to 250 seconds are suitable.

The batch is then drawn out of reactor 2 thru valve 19 and line 20 and pumped by pumping means 21 through line 22 into a wash kettle 23 provided with a vent 23a. The "wax resin" solution in wash kettle 23 is further diluted with more pale oil introduced into the wash kettle thru the reactor 2 and valve line 18 to give a 20% solution of "wax resin." Although we prefer to add the oil to the "wax resin" after neutralization of the latter, we may add the oil prior thereto.

The diluted product is then heated by means of closed steam coil 24 to a temperature of about 170 to 200° F. and agitated during this period with air introduced thru valve line 25. Open live steam is then introduced into the wash kettle 23 thru valved line 26 and the temperature rapidly raised to about 210° F. to 220° F. at which time the air and live steam are turned off. After settling for a few hours the oil solution of the "wax resin" is drawn off thru drawoff lines 27, 28, 29, 30, 31, 32, and 33, from the salts and other undesirable material in wash kettle 23. After all the "wax resin" solution has been drawn from the wash kettle the heavier undesirable materials which have settled to the bottom of the wash kettle are drawn off thru valved line 34.

In conducting the neutralization with ammonia gas and subsequently steaming the neutralized product, we have found it essential that the steaming, the purpose of which is to split off any unstable chlorine compounds and/or any ammonia, either free or combined, be carefully controlled so that only a minimum amount of steam will be introduced into the kettle. When the process is carried out in the manner described, no emulsion is obtained.

Although in our preferred embodiment we have described the condensation of chlorinated paraffin wax of 130° F. M. P. with naphthalene, we may use various types of waxes, such as paraffin waxes, petrolatum, montan wax, ozokerite, etc. In place of naphthalene other aromatic hydrocarbons such as anthracene, diphenyl, chlorinated diphenyl, phenanthrene, coal tar residues etc. may be used.

Heretofore the preparation of condensation type pour point depressors has been conducted in solution in a light oil such as kerosene for the purpose of aiding the separation of the emulsions formed during the washing step. In order that the finished "wax resin" might be used in lubricating oils, it has been necessary to distill off the kerosene or other light oil diluent so that the flash point of the lubricating oil would not be adversely affected. This resulted in a material darkening of the "wax resin" and a corresponding increase in the color of the oil in which it was incorporated. By conducting the washing of the "wax resin" in the more efficient manner herein described, we are able to use a much heavier oil which does not have to be removed from the condensation product. This eliminates the necessity of subjecting the condensation product to the high temperature of distillation, and consequently a product of improved color is obtained. "Wax resin", prepared by prior methods which required the removal of the diluent by distillation, when mixed to give a 20% solution in pale oil had a color of 7 N. P. A., whereas the product produced by our improved method has a color of 3 N. P. A. at the same concentration.

While we have described in detail the preferred embodiment of our invention, we do not limit ourselves to the details hereinabove set forth except as defined by the following claims.

We claim:
1. In the process of preparing a "wax resin" pour point depressor by the condensation of a mixture of a chlorinated paraffin wax and naphthalene with aluminum chloride the method of purifying the "wax resin" which comprises neutralizing the reaction products with anhydrous ammonia gas, diluting the neutralized products with an oil having a Saybolt universal viscosity of 100–250 seconds at 100° F., heating the diluted mixture to a temperature of about 170–200° F., introducing live steam into the mixture until a temperature of about 210–220° F. is obtained, permitting the mixture to settle and subsequently separating the purified "wax resin" from the undesirable reaction products.

2. In the process of preparing a "wax resin" pour point depressor produced by the condensation of a mixture of a chlorinated paraffin wax and naphthalene with aluminum chloride the method of purifying the "wax resin" which comprises neutralizing the "wax resin" with anhydrous ammonia gas, diluting the neutralized products with an oil having a Saybolt universal viscosity of 100–250 seconds at 100° F., heating the diluted mixture to a temperature of about 170–200° F., introducing a small amount of live steam into the mixture, raising the temperature to about 210–220° F., permitting the mixture to settle and subsequently separating the purified "wax resin" from the undesirable reaction products.

3. The process of preparing a pour point depressor which comprises heating a chlorinated wax with about 10% of an aromatic hydrocarbon to a temperature of about 250–350° F., adding to the heated mixture about 10–15% aluminum chloride, adding anhydrous ammonia gas to the reaction products, diluting the neutralized reaction products with a pale petroleum oil having a Saybolt universal viscosity of about 100–250 seconds at 100° F., to give a 20% solution of the said reaction products, heating the diluted mixture to about 180–200° F., while agitating the same, passing live steam into the heated diluted mixture until a temperature of about 210–220° F. is obtained, settling the diluted mixture and subsequently separating the desired diluted reaction products from the undesirable settled reaction products.

4. In the process of preparing a pour point depressor formed by the condensation of a mixture of a chlorinated paraffin wax and naphthalene in the presence of aluminum chloride, the method of purifying the pour point depressor resulting from said condensation which comprises neutralizing the pour point depressor with ammonia, blowing the neutralized mixture for a short time at a temperature of about 200–220° F. to remove ammonia and chlorine compounds, diluting the mixture with a pale oil of about 100 to 250 seconds Saybolt viscosity at 100° F., and separating the clear depressor solution from the solution containing aluminum residues.

5. In the process of preparing a pour point depressor formed by the condensation of a mixture of a chlorinated paraffin wax and naphthalene in the presence of aluminum chloride, the method of purifying the pour point depressor resulting from said condensations which comprises neutralizing the pour point depressor with ammonia adding only a small amount of moisture and blowing at a temperature of about 200–220° F. to facilitate the removal of chlorine compounds without substantial distillation of normally liquid components of the mixture, diluting the mixture with a diluent of high flash point, settling a purified pour point depressor layer from a layer containing aluminous sludge without the formation of emulsions, and subsequently removing the purified pour point depressor from the sludge layer.

6. In the process of preparing a pour point depressor by the condensation of a mixture of a chlorinated paraffin wax and naphthalene with aluminum chloride in a glass lined reactor the method of purifying the pour point depressor which comprises neutralizing the reaction products with ammonia, diluting the neutralized products with an oil having a high flash point and a Saybolt universal viscosity of about 100 seconds to 250 seconds at 100° F., blowing the diluted mixture at a temperature of about 200° F., to facilitate removal of chlorine and ammonium compounds, permitting the mixture to settle and subsequently separating the oil solution of purified pour point depressor from sludge containing material.

7. The method of making a pour point depressor which comprises adding small amounts of aluminum chloride to a mixture of naphthalene and chlorinated wax at a high temperature with violent agitation, heating the mixture to a temperature of 250–350° F., maintaining the mixture at said temperature for at least an hour, cooling the mixture to 200° F., adding ammonia to the hot mixture, adding moisture to the mixture at a temperature of about 200–220° F., and blowing with air, adding a diluent of relatively high flash point to the hot mixture, allowing the diluted mixture to settle and separately withdrawing the clear diluted pour point depressor from the sludge materials.

8. The method of making pour point depressors which comprises effecting a condensation of chlorinated wax with naphthalene at a high temperature by adding thereto with violent agitation small amounts of aluminum chloride, heating the reaction mixture to about 250–350° F., cooling the mixture back to about 200° F., neutralizing the mixture with ammonia and blowing it with air in the presence of a small amount of moisture at about 200–220° F., diluting the mixture at this high temperature with oil having a sufficiently high flash point to make a subsequent distillation of diluent unnecessary and separating the diluted pour point depressor from sludge materials.

9. The method of claim 8 wherein the reaction is carried out without coming in contact with metal.

10. The method of claim 8 wherein the chlorinated wax is prepared by chlorinating paraffin wax of about 130° F. melting point without coming in contact with metal.

FREDERICK H. MacLAREN.
THOMAS E. STOCKDALE.